United States Patent
Maly et al.

(10) Patent No.: US 8,562,724 B2
(45) Date of Patent: Oct. 22, 2013

(54) METHODS AND SYSTEMS FOR REMOVING POLLUTANTS FROM FLUID STREAM

(75) Inventors: Peter Martin Maly, Lake Forest, CA (US); Robert Taylor, Ponte Vedra Beach, FL (US); Vishal Bansal, Overland Park, KS (US)

(73) Assignee: General Electric Company, Schenectady, NY (US)

( * ) Notice: Subject to any disclaimer, the term of this patent is extended or adjusted under 35 U.S.C. 154(b) by 239 days.

(21) Appl. No.: 13/038,080

(22) Filed: Mar. 1, 2011

(65) Prior Publication Data

US 2012/0222410 A1    Sep. 6, 2012

(51) Int. Cl.
*B01D 53/02* (2006.01)

(52) U.S. Cl.
USPC ......... 96/114; 96/115; 95/26; 95/107; 60/297

(58) Field of Classification Search
USPC ............... 95/26, 107; 96/114–115; 60/297
See application file for complete search history.

(56) References Cited

U.S. PATENT DOCUMENTS

| | | | |
|---|---|---|---|
| 5,116,395 A | 5/1992 | Williams | |
| 5,505,766 A | 4/1996 | Chang | |
| 5,711,785 A | 1/1998 | Maxwell | |
| 6,579,507 B2 | 6/2003 | Pahlman et al. | |
| 6,719,828 B1 | 4/2004 | Lovell et al. | |
| 7,033,548 B2 | 4/2006 | Pahlman et al. | |
| 7,043,943 B2 | 5/2006 | Koopmann et al. | |
| 7,172,685 B2 | 2/2007 | Thompson et al. | |
| 7,344,035 B1 | 3/2008 | Koopmann et al. | |
| 7,368,289 B2 | 5/2008 | Baldwin et al. | |
| 7,396,514 B2 | 7/2008 | Hammel | |
| 7,435,286 B2 | 10/2008 | Olson et al. | |
| 7,494,632 B1 | 2/2009 | Klunder | |
| 2008/0060519 A1* | 3/2008 | Maly et al. | 95/107 |
| 2008/0105121 A1 | 5/2008 | Chang | |
| 2008/0131324 A1 | 6/2008 | Baldwin et al. | |
| 2009/0062119 A1 | 3/2009 | Olson et al. | |
| 2009/0297413 A1 | 12/2009 | Olson et al. | |
| 2009/0320678 A1 | 12/2009 | Chang et al. | |
| 2010/0024639 A1* | 2/2010 | Taylor | 95/2 |
| 2010/0047146 A1 | 2/2010 | Olson et al. | |

FOREIGN PATENT DOCUMENTS

| | | |
|---|---|---|
| CA | 2666542 A1 | 5/2008 |
| EP | 2177254 A1 | 4/2010 |
| GB | 2452516 A | 2/2010 |
| JP | 4156920 A | 5/1992 |
| JP | 7204432 A2 | 8/1995 |
| JP | 9308817 A2 | 12/1997 |

(Continued)

OTHER PUBLICATIONS

International Search Report; Application No. GB1203539.0; dated Jun. 28, 2012; pp. 3.

*Primary Examiner* — Christopher P Jones
(74) *Attorney, Agent, or Firm* — Armstrong Teasdale LLP

(57) ABSTRACT

A pollutant removal system for use with a power generation system includes a particulate control device configured to remove particulates from a flue gas stream produced within the power generation system. The particulate control device is cleaned on a predetermined cleaning cycle. The pollutant removal system also includes a sorbent control system for controllably injecting a sorbent into the flue gas stream upstream of the particulate control device. The sorbent control system is configured to adjust a sorbent injection rate as a function of the cleaning cycle.

20 Claims, 5 Drawing Sheets

(56) References Cited

FOREIGN PATENT DOCUMENTS

| | | |
|---|---|---|
| JP | 11267432 A2 | 10/1999 |
| JP | 11309316 A2 | 11/1999 |
| JP | 2000107562 A | 4/2000 |
| JP | 2009291734 A | 12/2009 |
| WO | 2008058026 A2 | 5/2008 |
| WO | 2009012189 A2 | 1/2009 |
| WO | 2010046309 A1 | 4/2010 |

* cited by examiner

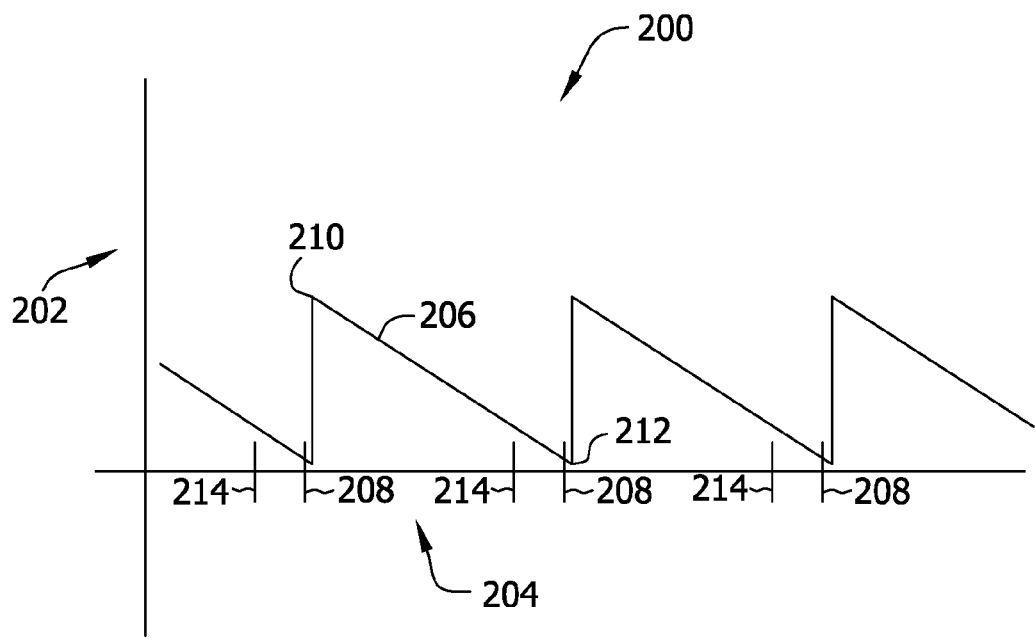
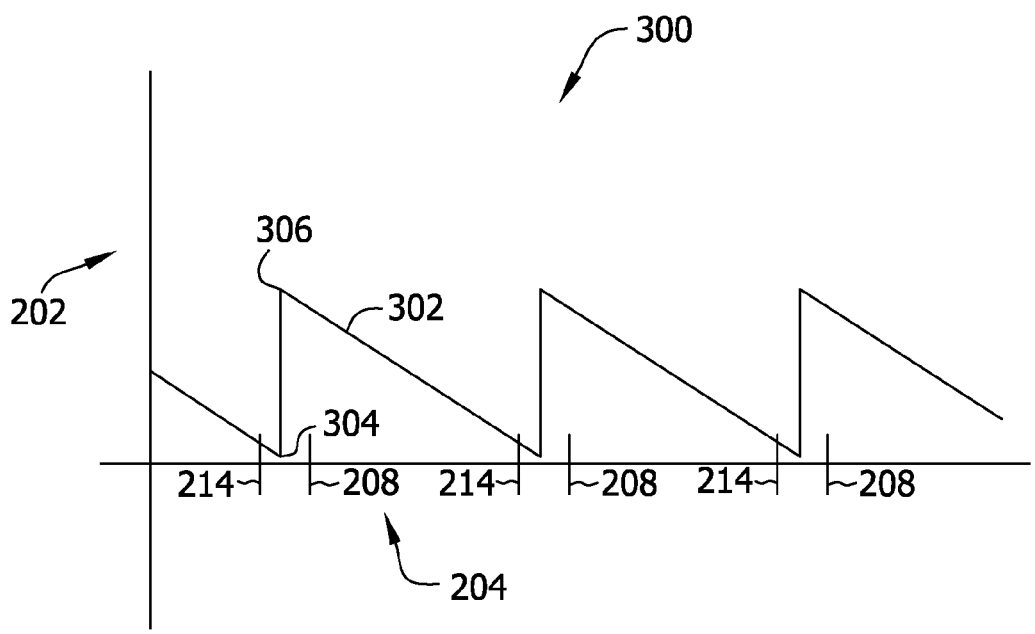

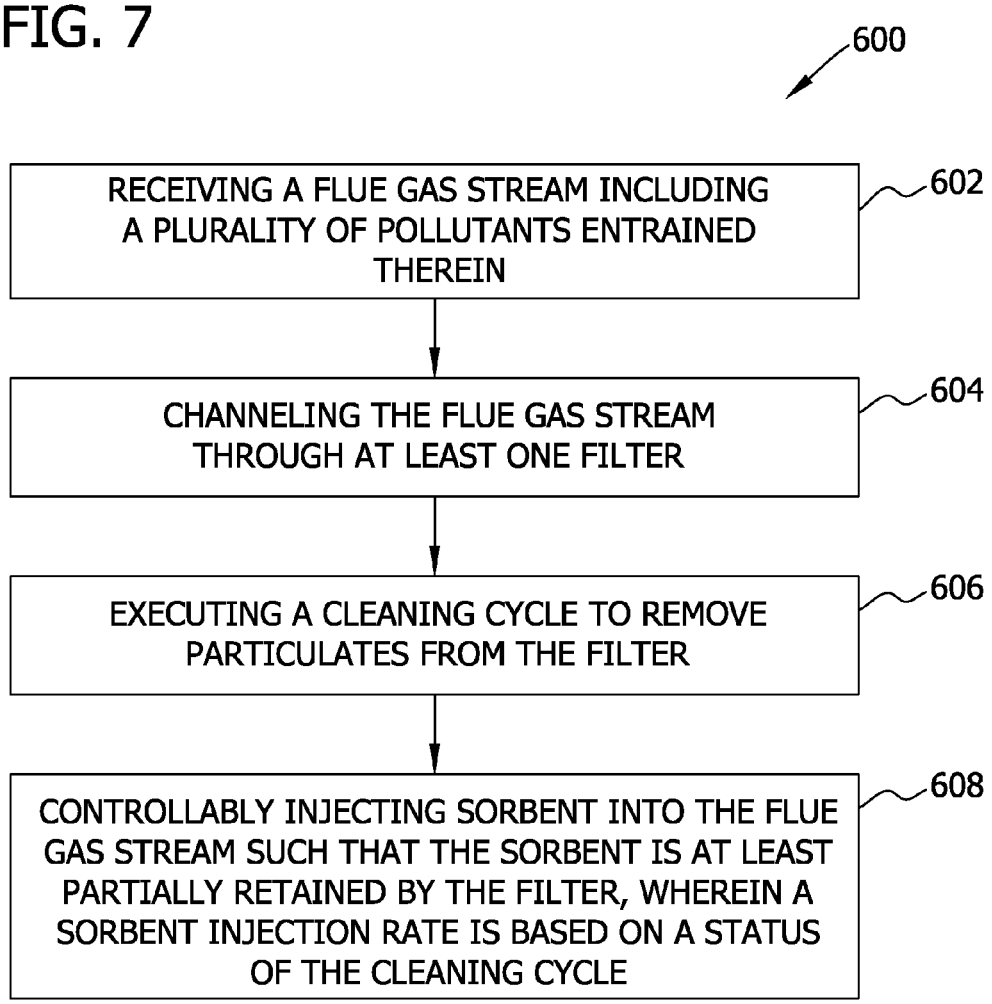

METHODS AND SYSTEMS FOR REMOVING POLLUTANTS FROM FLUID STREAM

BACKGROUND OF THE INVENTION

The present application relates generally to combustion devices and, more particularly, to methods and systems for removing pollutants from an exhaust stream generated by the combustion devices.

During a typical combustion process within a furnace, for example, a flow of exhaust gases, or flue gases, is produced. Known exhaust gases contain combustion products including, but not limited to, carbon, fly ash, carbon dioxide, carbon monoxide, water, hydrogen, nitrogen, sulfur, chlorine, arsenic, selenium, and/or mercury.

Emissions from coal-fired power plants are subject to governmental regulation. At least some known pollutant control systems inject a sorbent, such as activated carbon, into the flow of flue gases to react with pollutants therein, such as mercury. Because carbon is more reactive with mercury at temperatures below 350° F., activated carbon is typically injected remotely from the combustion source. The injection location is also upstream from a particulate collection device, such as a baghouse. The activated carbon is retained within one or more filters positioned within the baghouse such that mercury is at least partially removed from the flue gases as the flue gases flow through and contact the activated carbon to react with the activated carbon.

During the operation of at least some known baghouses, the activated carbon is periodically removed to prevent the baghouse filters from becoming clogged with particulates. However, as the activated carbon is removed, mercury emissions may increase until additional activated carbon is introduced into the flow of flue gases. More generally, during such periods, the mercury emissions may increase above established regulatory limits during and/or after the baghouse filters have been cleaned, and before sufficient activated carbon has been reabsorbed by the baghouse filters.

BRIEF DESCRIPTION OF THE INVENTION

In one embodiment, a pollutant removal system for use with a power generation system is provided that includes a particulate control device configured to remove particulates from a flue gas stream produced within the power generation system. The particulate control device is cleaned on a predetermined cleaning cycle. The pollutant removal system also includes a sorbent control system for controllably injecting a sorbent into the flue gas stream upstream of the particulate control device. The sorbent control system is configured to adjust a sorbent injection rate as a function of the cleaning cycle.

In another embodiment, a power generation system is provided that includes a furnace configured to combust fuel and to generate a stream of flue gas from the combusted fuel, and a particulate control device coupled in flow communication with the furnace and configured to remove particulates from the flue gas stream. The particulate control device is cleaned on a predetermined cleaning cycle. The power generation system also includes a sorbent control system for controllably injecting a sorbent into the flue gas stream upstream of the particulate control device. The sorbent control system is configured to adjust a sorbent injection rate as a function of the cleaning cycle.

In yet another embodiment, a method for removing pollutants from a flue gas stream is provided that includes receiving a flue gas stream including a plurality of pollutants entrained therein and channeling the flue gas stream through at least one filter. A cleaning cycle is executed to remove particulates from the filter, and sorbent is controllably injected into the flue gas stream such that the sorbent is at least partially retained by the filter, wherein a sorbent injection rate is as a function of a status of the cleaning cycle.

BRIEF DESCRIPTION OF THE DRAWINGS

FIG. 3 is a graphical representation of an exemplary sorbent injection control algorithm that may be used with the pollutant removal system shown in FIG. 2.

FIGS. 4-6 are graphical representations of alternative sorbent injection control algorithms that may be used with the pollutant removal system shown in FIG. 2.

FIG. 7 is a flow diagram of an exemplary method that may be used to remove pollutants from a flue gas stream using the pollutant removal system shown in FIG. 2.

DETAILED DESCRIPTION OF THE INVENTION

Figure 1:
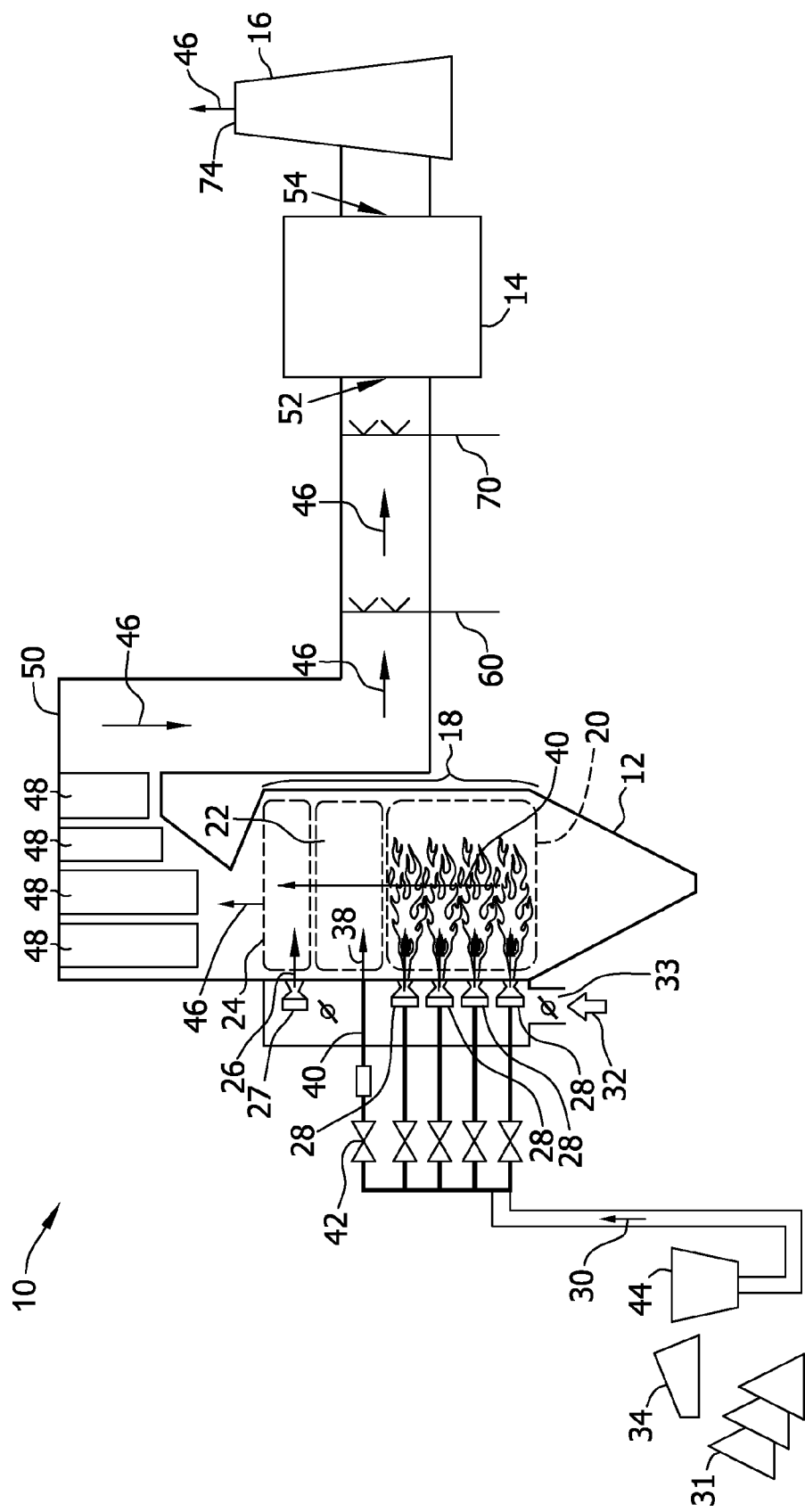
FIG. 1 is a schematic view of an exemplary power generation system.

FIG. 1 is a schematic view of an exemplary power generation system 10 that generally includes a furnace 12, a particulate control device 14, and an exhaust stack 16. Specifically, in the exemplary embodiment, furnace 12 includes a combustion zone 18 that includes a primary combustion area 20, a reburning area 22, and an overfire air or burnout area 24. In another embodiment, furnace 12 may be a "straight fire" furnace wherein combustion zone 18 does not include reburning area 22 and/or burnout area 24. Alternatively, furnace 12 may have any configuration that enables power generation system 10 to function as described herein.

In the exemplary embodiment, primary combustion area 20 includes a plurality of fuel injectors or burners, 28 that are supplied with a predetermined quantity of fuel 30 from a fuel inlet 44 and a predetermined quantity of air 32 from an air inlet 33. A fuel-air controller (not shown) controls the ratio and amounts of air 32 and fuel 30 supplied to burners 28. As used herein, the term "controller" broadly refers to a processor, a computer, a microcontroller, a microcomputer, a programmable logic controller, an application specific integrated circuit, and any other programmable circuit. As used herein, the term "processor" may include any programmable system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "processor".

In the exemplary embodiment, fuel 30 is coal 34 supplied from a fuel source 31, such as, but not limited to being, a coal mill. Specifically, in the exemplary embodiment, coal 34 is pulverized and may be, but is not limited to being, a bituminous coal, a Powder River Basin (PRB) coal, a lignite coal, any/or any other suitable coal that enables furnace 12 to function as described herein. Alternatively, system 10 may be supplied with any other suitable fuel, including but not limited to, oil, natural gas, biomass, waste, and/or any other fossil and/or renewable fuel that enables furnace 12 to function as described herein.

In the exemplary embodiment, reburning area 22 is downstream from primary combustion area 20 and receives a predetermined quantity of reburn fuel 38 injected therein from a reburn fuel injector 40. More specifically, in the exemplary embodiment, reburn fuel 38, such as coal 34, is supplied to reburn fuel injector 40 through a series of fuel shut off valves 42. Alternatively, reburn fuel injector 40 may receive fuel 30 from a source other than fuel source 31 and the fuel may be any other fuel other than coal 34. For example, in an alternative embodiment, reburn fuel 38 injected through injectors 40 may be any other suitable fuel, such as, but not limited to, oil, natural gas, biomass, waste, and/or any other fossil and/or renewable fuel.

In the exemplary embodiment, burnout area 24 is downstream from reburning area 22, within combustion zone 18, and receives overfire air 26 injected therein from at least one overfire air injector 27. In the exemplary embodiment, overfire air injector 27 is coupled in flow communication with air inlet 33. More specifically, in the exemplary embodiment, a predetermined quantity of overfire air 26 is injected into burnout area 24 through injector 27. Alternatively, burnout area 24 may receive overfire air 26 from a different source than air inlet 33.

System 10 also includes a plurality of heat exchangers 48. A duct, or convective pass 50, extending downstream from heat exchangers 48 is coupled in flow communication between furnace 12 and particulate control device 14. Moreover, in the exemplary embodiment, convective pass 50 includes a sorbent injector 60 and a coolant injector 70. Alternatively, convective pass 50 may only include sorbent injector 60.

In the exemplary embodiment, particulate control device 14 is a baghouse used to collect fly ash containing oxidized mercury and/or particulate-bound mercury. Alternatively, particulate control device 14 may be an electrostatic precipitator, a cyclone, and/or any other device that collects mercury and/or other pollutants. Particulate control device 14 includes an inlet 52 and an outlet 54 that is coupled in flow communication with stack 16.

During operation of system 10, fuel 30 is supplied to system 10 from fuel source 31. In the exemplary embodiment, fuel 30 enters system 10 through fuel inlet 44, and air 32 is supplied to system 10 through air inlet 33. Primary combustion area 20 receives a predetermined quantity of fuel and air, as controlled by the controller, for combustion using burners 28. Primary combustion area 20 ignites the fuel/air mixture to create combustion or flue gases 46. In the exemplary embodiment, flue gases 46 are channeled downstream from primary combustion area 20 into reburning area 22. A predetermined quantity of reburn fuel 38, as controlled by the controller, is injected into reburning area 22 through reburn fuel injectors 40. The amount of reburn fuel 38 is selected to create a fuel-rich environment in reburning area 22. As such, a smaller percentage of the carbon in reburn fuel 38 is combusted, such that the loss-on-ignition (LOI) is facilitated to be increased and/or optimized. Moreover, a high-carbon content fly ash created in the flue gases 46 facilitates increasing an amount of mercury that is oxidized therein.

Flue gases 46 generated by system 10 are channeled downstream from reburning area 22 into burnout area 24. A predetermined quantity of overfire air 26 is injected into burnout area 24 via overfire air injector 27. In the exemplary embodiment, the quantity of overfire air 26 is selected to facilitate substantially completing the combustion of fuel 30 and reburn fuel 38, which facilitates reducing pollutants in flue gases 46, such as, but not limited to, nitrogen oxides, $NO_x$, and/or carbon monoxide, CO. More specifically, in the exemplary embodiment, the quantity of overfire air 26 injected is selected to facilitate preventing complete burnout of the carbon in the fly ash, thus facilitating increasing mercury capture by the fly ash.

In the exemplary embodiment, flue gases 46 exit combustion zone 18 and enter a plurality of heat exchangers 48. Heat exchangers 48 transfer heat from flue gases 46 to a fluid (not shown) to facilitate heating the fluid. In one embodiment, the heated fluid may generate steam that may be used to generate power using known power generation methods and systems such as, for example, a steam turbine (not shown). The resulting power may be supplied to a power grid (not shown).

In the exemplary embodiment, flue gases 46 are channeled from heat exchangers 48 to a convective pass 50. As flue gases 46 flow through convective pass 50, the flue gases 46 are cooled to a temperature that is less than a combustion temperature of flue gases 46. More specifically, in the exemplary embodiment, flue gases 46 within pass 50 are cooled convectively by ambient air, water, and/or any other suitable heat transfer fluid (not shown). Moreover, in the exemplary embodiment, flue gases 46 are cooled to a temperature that enables mercury to react with the carbon in the fly ash, for example, but not limited to, a temperature below about 350° F., to form oxidized mercury. Mercury may also react with elements and/or compounds within flue gases 46 to form particulate-bound mercury.

In the exemplary embodiment, a sorbent injector 60 injects sorbent into convective pass 50. In the exemplary embodiment, the sorbent is activated carbon. Alternatively, the sorbent may be any other suitable element and/or compound that enables power generation system 10 to function as described herein. In the exemplary embodiment, the sorbent reacts with mercury present within the flue gases 46 to form mercury oxide and/or particulate-bound mercury.

A coolant injector 70 injects a predetermined quantity of coolant into convective pass 50. The coolant facilitates reducing an operating temperature of flue gases 46 entering particulate control device 14, and thereby reduces the temperature of particulate control device 14. In the exemplary embodiment, the coolant is water that is atomized prior to being injected into convective pass 50. Alternatively, the coolant may be ambient air and/or any other coolant that enables system 10 to function as described herein. In the exemplary embodiment, the coolant facilitates reducing the temperature of flue gases 46 and particulate control device 14 to between about 250° F. to about 310° F. Alternatively, the coolant may facilitate reducing the temperature of flue gases 46 and particulate control device 14 to any other temperature as desired. In the exemplary embodiment, the reduced temperatures of flue gases 46 and particulate control device 14 enables a reaction between the mercury present within flue gases 46 and the fly ash. More specifically, reducing the temperature of flue gases 46 and particulate control device 14 facilitates improving a natural mercury capture on the fly ash.

In the exemplary embodiment, flue gases 46 and the sorbent flow through convective pass 50 to particulate control device 14. In one embodiment, system 10 may also include an ash burnout unit (not shown) and/or a mercury collection unit (not shown) coupled to particulate control device 14 to facilitate capturing mercury from flue gases 46. System 10 may also include a wet scrubber (not shown) and/or a dry scrubber (not shown) coupled downstream from particulate control device 14 to facilitate removing oxidized mercury and/or particulate-bound mercury from flue gases 46 and/or other compounds and/or elements from flue gases 46, such as, for example, sulfur dioxide.

Figure 2:
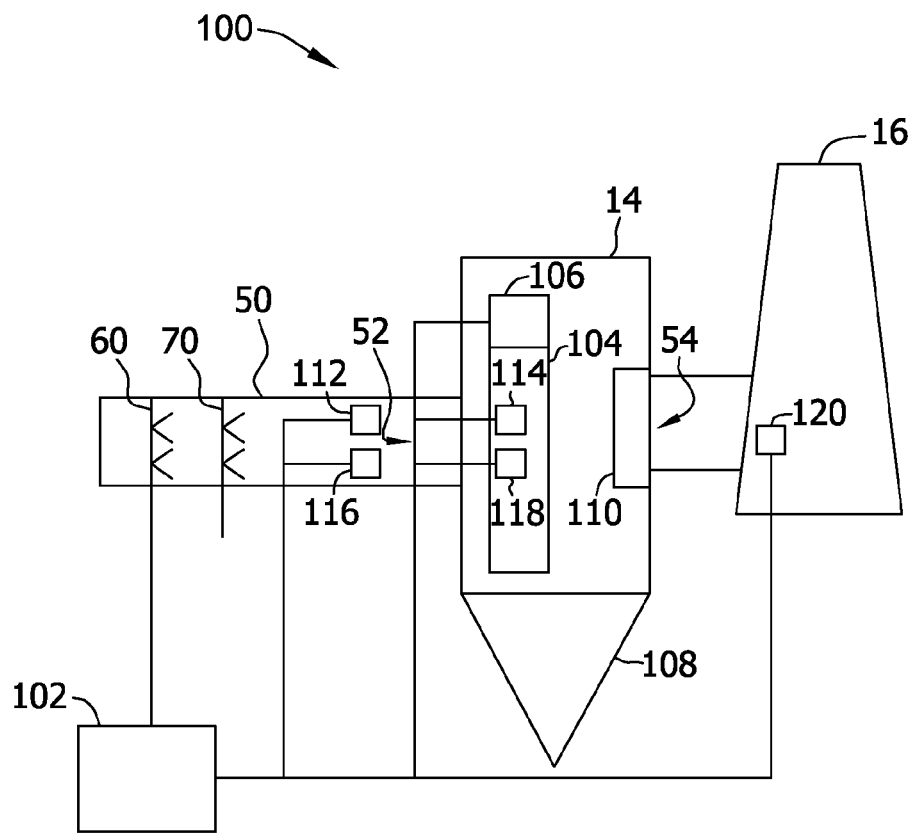
FIG. 2 is a block diagram of an exemplary pollutant removal system that may be used with the power generation system shown in FIG. 1.

FIG. 2 is a block diagram of an exemplary pollutant removal system 100 that may be used with power generation system 10 (shown in FIG. 1). In the exemplary embodiment, pollutant removal system 100 includes particulate control device 14, stack 16, sorbent injector 60, and coolant injector 70. Moreover, in the exemplary embodiment, pollutant removal system 100 also includes a sorbent injection controller 102 coupled to sorbent injector 60.

In the exemplary embodiment, particulate control device 14 includes at least one filter 104 that is coupled in flow communication between inlet 52 and outlet 54. Filter 104 may be any suitable bag or cartridge. A cleaning device 106 is coupled to filter 104 for removing particulates, such as fly ash and/or sorbent, that have accumulated on and/or within filter 104. In the exemplary embodiment, cleaning device 106 directs "reverse" pulses of high pressure air towards and/or through filter 104 to facilitate dislodging particulates that have accumulated on and/or within filter 104. Alternatively, cleaning device 106 may use any other method and/or mechanism to dislodge particulates from filter 104. In the exemplary embodiment, particulates removed from filter 104 by cleaning device 106 are gravity-fed into a hopper 108 for collection and removal from pollutant removal system 100. Moreover, in the exemplary embodiment, fan 110 is positioned proximate to outlet 54 within particulate control device 14. Fan 110 draws flue gases, such as flue gases 46 (shown in FIG. 1), from convective pass 50 into particulate control device 14 via inlet 52, through filter 104, and exhausts "cleaner" flue gases through outlet 54. In the exemplary embodiment, exhausted flue gases are channeled from outlet 54 to stack 16 wherein the gases are released into an external environment.

Cleaning device 106, in the exemplary embodiment, is coupled to sorbent injection controller 102 for executing a scheduled or predetermined cleaning cycle on filter 104. As used herein, the term "cleaning cycle" refers to the time period that elapses between an initiation of an operation of cleaning device 106 and a termination of an operation of cleaning device 106. As such, during a cleaning cycle, particulates, such as sorbent and fly ash, are removed from filter 104. Moreover, sorbent injection controller 102 controls an operation of cleaning device 106, such as, determines a time to initiate a cleaning cycle on filter 104 (hereinafter referred to as a "cleaning cycle initiation time") and a time to terminate the cleaning cycle on filter 104 (hereinafter referred to as a "cleaning cycle termination time"). Furthermore, in the exemplary embodiment, sorbent injection controller 102 determines a cleaning cycle frequency and a cleaning cycle duration. Alternatively, any other controller and/or system may be used to control the operation of cleaning device 106. In the exemplary embodiment, sorbent injection controller 102 controls and/or adjusts a rate that sorbent injector 60 introduces sorbent into convective pass 50 (hereinafter referred to as a "sorbent injection rate") based on, or as a function of, the cleaning cycle status. In the exemplary embodiment, the cleaning cycle status may be determined based on whether a cleaning cycle is in progress, a time that has elapsed since a cleaning cycle has been initiated or terminated, and/or a time until an upcoming cleaning cycle is scheduled to be initiated or terminated. Alternatively, the cleaning cycle status may be determined based on any other condition that enables pollutant removal system 100 to function as described herein.

In the exemplary embodiment, pollutant removal system 100 also includes at least one inlet pressure sensor 112 positioned within and/or proximate to inlet 52, and at least one filter pressure sensor 114 positioned within and/or proximate to filter 104, such as at an outlet end (not shown) of filter 104.

In the exemplary embodiment, inlet pressure sensor 112 and filter pressure sensor 114 detect and/or measure a pressure within inlet 52 and within filter 104, respectively. Moreover, in the exemplary embodiment, pollutant removal system 100 includes at least one inlet temperature sensor 116 that is positioned within and/or proximate to inlet 52, and at least one filter temperature sensor 118 that is positioned within and/or proximate to filter 104. In the exemplary embodiment, inlet temperature sensor 116 and filter temperature sensor 118 detect and/or measure a temperature within inlet 52 and within filter 104, respectively. Alternatively, inlet pressure sensor 112, filter pressure sensor 114, inlet temperature sensor 116, and/or filter temperature sensor 118 may be positioned at any location within pollutant removal system 100.

Sorbent injection controller 102, in the exemplary embodiment, is coupled to inlet pressure sensor 112, filter pressure sensor 114, inlet temperature sensor 116, and filter temperature sensor 118. Moreover, in the exemplary embodiment, sorbent injection controller 102 calculates a differential pressure across filter 104 by subtracting a pressure value received from inlet pressure sensor 112 (hereinafter referred to as an "inlet pressure value") from a pressure value received from filter pressure sensor 114 (hereinafter referred to as a "filter pressure value"). Sorbent injection controller 102 may also calculate a differential temperature across filter 104 by subtracting a temperature value received from inlet temperature sensor 116 (hereinafter referred to as an "inlet temperature value") from a temperature value received from filter temperature sensor 118 (hereinafter referred to as a "filter temperature value"). In one embodiment, sorbent injection controller 102 may control the sorbent injection rate at least partially based on the calculated differential pressure and/or the differential temperature across filter 104.

Moreover, in the exemplary embodiment, stack 16 includes at least one stack emission analyzer 120 that is coupled to sorbent injection controller 102 for use in determining one or more emission characteristics of the exhausted flue gases. In one embodiment, sorbent injection controller 102 may control the sorbent injection rate at least partially based on the determined emission characteristics of the exhausted flue gases. For example, sorbent injection controller 102 may control the sorbent injection rate based on any combination of values and/or signals received from cleaning device 106, inlet pressure sensor 112, filter pressure sensor 114, inlet temperature sensor 116, filter temperature sensor 118, stack emission analyzer 120, and/or any other device that enables power generation system 10 to function as described herein.

Alternatively, pollutant removal system 100 may include a plurality of convective passes 50 for channeling a plurality of flue gas streams to particulate control device 14. In such a configuration, each convective pass 50 includes separate sorbent injectors 60, inlet pressure sensors 112, and/or inlet temperature sensors 116 that are coupled to separate sorbent injection controllers 102. Moreover, separate filters 104, filter pressure sensors 114, and/or filter temperature sensors 118 may be coupled in flow communication with each convective pass 50, and each filter 104 may be provided with a respective cleaning device 106. As such, each sorbent injection controller 102 may control each respective sorbent injector 60 independently of every other sorbent injector 60, for example, to enable an amount of sorbent injected into each convective pass 50 to be independently adjusted.

During operation, in the exemplary embodiment, flue gas is channeled to particulate control device 14 via convective pass 50. Sorbent and/or coolant is injected into the flue gas by sorbent injector 60 and/or coolant injector 70. Sorbent is entrained in the flue gas and is channeled into particulate control device 14. Fan 110 draws the flue gas through filter 104 and into stack 16. As the flue gas is directed through filter 104, the sorbent is deposited on and/or retained by filter 104. As sorbent accumulates on filter 104, the differential pressure across filter 104 increases. Inlet pressure sensor 112 and filter pressure sensor 114 transmit pressure measurements to sorbent injection controller 102 for use in calculating the differential pressure and/or for use in controlling the sorbent injection rate. Moreover, inlet temperature sensor 116 and filter temperature sensor 118 transmit temperature measurements of the flue gas and/or of ambient temperatures within convective pass 50 and within particulate control device 14 to sorbent injection controller 102 for measuring the differential temperature.

As the flue gas is channeled through filter 104, mercury entrained within the flue gas reacts with sorbent that has accumulated on filter 104 such that an amount of mercury within the flue gas is substantially reduced after the flue gas exits filter 104. As the flue gas is exhausted through stack 16, stack emission analyzer 120 detects emission characteristics of the flue gas and transmits the detected emission characteristics to sorbent injection controller 102.

Moreover, in one embodiment, sorbent injection controller 102 operates a cleaning cycle of cleaning device 106 using a predefined upper pressure setpoint and a predefined lower pressure setpoint. More specifically, sorbent injection controller 102 is programmed with predefined upper and predefined lower pressure setpoints. If sorbent injection controller 102 determines that the differential pressure exceeds the upper pressure setpoint, sorbent injection controller 102 directs cleaning device 106 to initiate a cleaning cycle. During the cleaning cycle, cleaning device 106 channels pulses of high pressure air towards filter 104 to facilitate removing accumulated sorbent and other particulates. As the particulates are removed from filter 104, the differential pressure is reduced. If sorbent injection controller 102 determines that the differential pressure is reduced below the lower pressure setpoint, sorbent injection controller 102 directs cleaning device 106 to terminate the cleaning cycle.

In the exemplary embodiment, sorbent injection controller 102 adjusts the sorbent injection rate based on the status of the cleaning device 106, such as based on the status of the cleaning cycle. More specifically, in the exemplary embodiment, sorbent injection controller 102 increases the sorbent injection rate to a predetermined maximum injection rate after a predetermined amount of time has elapsed after the cleaning cycle is terminated. Sorbent injection controller 102 reduces, such as progressively reduces, the sorbent injection rate thereafter until the sorbent injection rate reaches a predetermined minimum injection rate and/or until another cleaning cycle is initiated. More specifically, in the exemplary embodiment, the sorbent injection rate progressively decreases as the differential pressure increases. In one embodiment, if the sorbent injection rate reaches the predetermined minimum injection rate, sorbent injection controller 102 maintains the sorbent injection rate at the minimum injection rate. Moreover, as described more fully below, in alternative embodiments, the sorbent injection rate is increased before a cleaning cycle is initiated or while a cleaning cycle is in progress.

FIG. 3 is a graphical representation of an exemplary sorbent injection control algorithm 200 that may be used by sorbent injection controller 102 to adjust an injection rate of sorbent injector 60 (both shown in FIG. 2). In the exemplary embodiment, the ordinate axis of FIG. 3 is representative of a sorbent quantity 202 injected into convective pass 50 (shown in FIG. 2) based on input received from sorbent injection controller 102. The abscissa axis is representative of a time 204 during which sorbent quantity 202 is injected. Accordingly, FIG. 3 illustrates a sorbent injection rate 206 of pollutant removal system 100 (shown in FIG. 2).

In the exemplary embodiment, sorbent injection rate 206 is substantially maximized after a cleaning cycle termination time 208 of cleaning device 106 (shown in FIG. 2) has passed. After sorbent injection rate 206 reaches a predetermined maximum injection rate 210, sorbent injection rate 206 is reduced until a predetermined minimum injection rate 212 is reached. In the exemplary embodiment, minimum injection rate 212 occurs substantially at or near cleaning cycle termination time 208. Moreover, in the exemplary embodiment, sorbent injection rate 206 is reduced as the differential pressure across filter 104 increases and/or as a detected mercury emission level decreases. As such, in the exemplary embodiment, sorbent injection rate 206 is inversely proportional to the differential pressure across filter 104 after maximum injection rate 210 is reached and/or inversely proportional to the detected mercury emission level.

Alternatively, sorbent injection rate 206 may be reduced to substantially zero when a cleaning cycle initiation time 214 is reached, and/or at a predetermined time before cleaning cycle initiation time 214 is reached. Moreover, while FIG. 3 illustrates sorbent injection rate 206 having a substantially sawtooth waveform shape, it should be recognized that sorbent injection rate 206 may have any shape or slope that enables pollutant removal system 100 to function as described herein.

Figure 5:
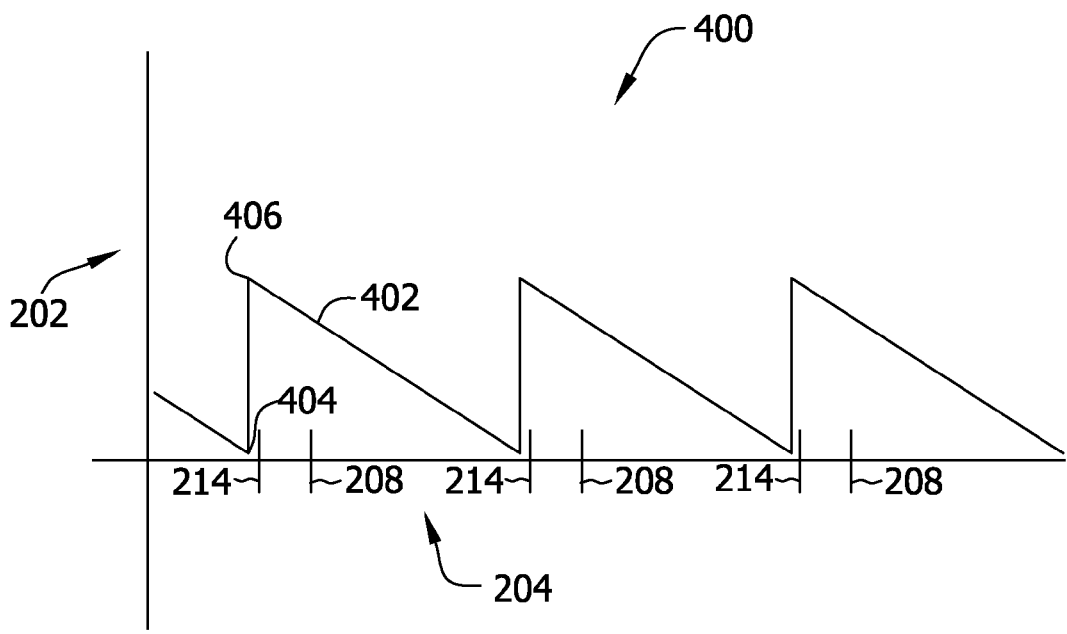

FIG. 4 is a graphical representation of an alternative sorbent injection control algorithm 300 that may be used by sorbent injection controller 102 to adjust an injection rate of sorbent injector 60 (both shown in FIG. 2). FIG. 5 is a graphical representation of another alternative sorbent injection control algorithm 400 that may be used to adjust an injection rate of sorbent injector 60.

In the exemplary embodiment shown in FIG. 4, a sorbent injection rate 302 of pollutant removal system 100 (shown in FIG. 2) is illustrated that reaches a predetermined minimum injection rate 304 and increases to a predetermined maximum injection rate 306 during a period between cleaning cycle initiation time 214 and cleaning cycle termination time 208. Accordingly, sorbent is injected into convective pass 50 (shown in FIG. 2) while a cleaning cycle of cleaning device 106 is in progress. As such, at least a portion of the sorbent should be present on filter 104 during the cleaning cycle and immediately after the cleaning cycle has terminated to enable mercury to be facilitated to be removed throughout an operation of pollutant removal system 100.

In the embodiment shown in FIG. 5, a sorbent injection rate 402 of pollutant removal system 100 is illustrated that reaches a predetermined minimum injection rate 404 and increases to a predetermined maximum injection rate 406 before cleaning cycle initiation time 214. Accordingly, sorbent is injected into convective pass 50 (shown in FIG. 2) before a cleaning cycle of cleaning device 106 is initiated. As such, at least a portion of the sorbent is facilitated to be present on filter 104 during the cleaning cycle and immediately after the cleaning cycle has terminated such that mercury is facilitated to be removed throughout an operation of pollutant removal system 100.

Figure 6:
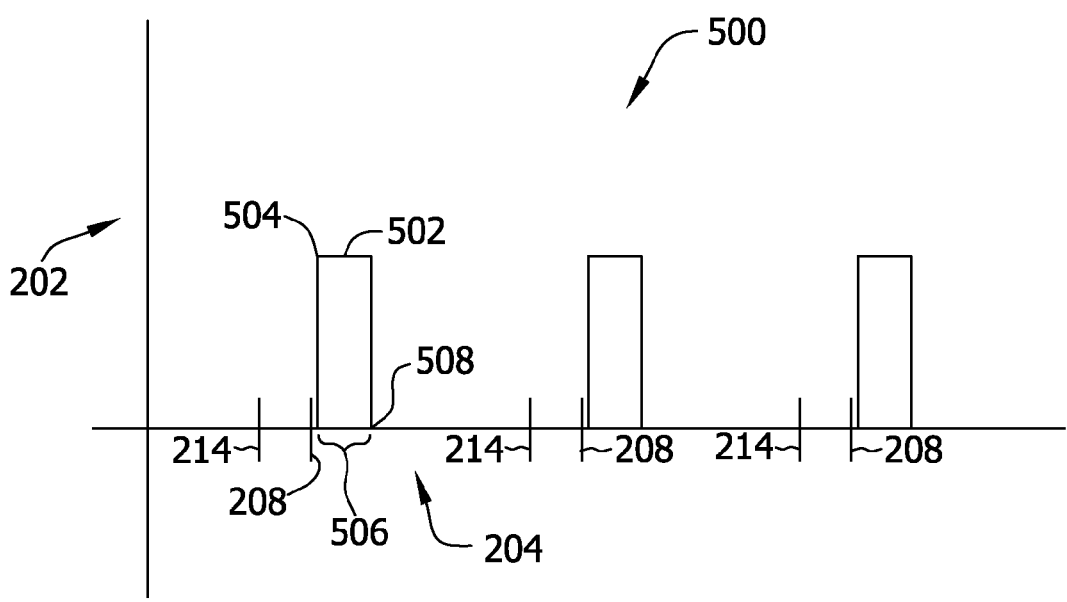

FIG. 6 is a graphical representation of yet another alternative sorbent injection control algorithm 500 that may be used by sorbent injection controller 102 to adjust an injection rate of sorbent injector 60 (both shown in FIG. 2). In the embodiment shown in FIG. 6, a sorbent injection rate 502 of pollutant removal system 100 (shown in FIG. 2) is illustrated that reaches a predetermined maximum injection rate 504 after a cleaning cycle of cleaning device 106 has terminated (i.e., after a cleaning cycle termination time 208). Moreover, sorbent injection rate 502 is maintained at maximum injection rate 504 for a predetermined time 506 to facilitate a rapid accumulation of sorbent on filter 104 after the cleaning cycle has terminated. After predetermined time 506 has elapsed, sorbent injection rate 502 is reduced to a predetermined minimum injection rate 508, such as to substantially zero, until a subsequent cleaning cycle has terminated. As such, sorbent is facilitated to be quickly replaced on filter 104 after the cleaning cycle has terminated such that an amount mercury emission is substantially minimized as a result of the cleaning cycle.

FIG. 7 is a flow diagram of an exemplary method 600 for removing pollutants from a flue gas stream. In the exemplary embodiment, method 600 is implemented by pollutant removal system 100 and is at least partially executed by sorbent injection controller 102 (both shown in FIG. 2). In the exemplary embodiment, method 600 includes receiving 602 a flue gas stream including a plurality of pollutants entrained therein and channeling 604 the flue gas stream through at least one filter, such as filter 104 (shown in FIG. 2). A cleaning cycle is executed 606 by a cleaning device, such as cleaning device 106 (shown in FIG. 2) to remove particulates from the filter. Sorbent is controllably injected 608 into the flue gas stream such that the sorbent is at least partially retained by the filter. In the exemplary embodiment, sorbent is controllably injected 608 by sorbent injector 60 (shown in FIG. 2), and a sorbent injection rate is controlled by sorbent injection controller 102. Moreover, in the exemplary embodiment, the sorbent injection rate is based on a status of the cleaning cycle.

In one embodiment, the sorbent injection rate is increased after a termination of the cleaning cycle, and the sorbent injection rate may be progressively decreased after the sorbent injection rate has reached a maximum injection rate. In another embodiment, the sorbent injection rate is increased to a predetermined maximum injection rate after a termination of the cleaning cycle. The sorbent injection rate is maintained for a predetermined amount of time, and is decreased to a predetermined minimum injection rate after the predetermined amount of time has elapsed. In alternative embodiments, the sorbent injection rate may be increased before, during, or after a cleaning cycle has been initiated, is in progress, or has completed.

Known particulate removal systems inject sorbent at a constant rate or at a variable rate based on emission characteristics. Such systems may exhibit increased mercury emissions when baghouse filters are cleaned. In contrast, in the present invention, pollutant removal system 100 (shown in FIG. 2) controls an injection of sorbent based on a cleaning cycle time and/or based on a differential pressure across filter 104 (shown in FIG. 2). As such, more sorbent is enabled to be present on filter 104 after a filter cleaning cycle has terminated to facilitate absorbing mercury from flue gases, as compared to known particulate removal systems.

A technical effect of the systems and method described herein includes at least one of: (a) receiving a flue gas stream including a plurality of pollutants entrained therein; (b) channeling a flue gas stream through at least one filter; (c) executing a cleaning cycle to remove particulates from a filter; and (d) controllably injecting sorbent into a flue gas stream such that the sorbent is at least partially retained by a filter, wherein a sorbent injection rate is based on a status of the cleaning cycle.

The above-described embodiments provide an efficient and cost-effective pollutant removal system for a power generation system. The pollutant removal system includes at least one filter and a cleaning device that executes a cleaning cycle on the filter to remove particulates that have been retained therein. A sorbent injection controller controls and/or adjusts a sorbent injection rate of a sorbent injector to absorb mercury and/or other pollutants from a flue gas stream that is channeled through the filter. The sorbent injection rate is controlled and/or adjusted based on a status of the cleaning cycle, based on a differential pressure across the filter, and/or based on emission characteristics of the flue gas as the gas is exhausted from the pollutant removal system.

Exemplary embodiments of a method and systems for use in removing pollutants from a fluid stream are described above in detail. The method and systems are not limited to the specific embodiments described herein, but rather, components of the systems and/or steps of the method may be utilized independently and separately from other components and/or steps described herein. For example, the pollutant removal system may also be used in combination with other power systems and methods, and is not limited to practice with only the power generation system as described herein. Rather, the exemplary embodiment can be implemented and utilized in connection with many other power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A pollutant removal system for use with a power generation system, said pollutant removal system comprising:
   a particulate control device configured to remove particulates from a flue gas stream produced within the power generation system, said particulate control device cleaned on a predetermined cleaning cycle; and
   a sorbent control system for controllably injecting a sorbent into the flue gas stream upstream of said particulate control device, said sorbent control system configured to increase a sorbent injection rate based on a cleaning cycle initiation time of the predetermined cleaning cycle.

2. A pollutant removal system in accordance with claim 1, wherein said sorbent control system is configured to:
   increase the sorbent injection rate to a predetermined maximum injection rate; and
   decrease the sorbent injection rate after the predetermined maximum injection rate is reached.

3. A pollutant removal system in accordance with claim 2, wherein said sorbent control system is configured to increase the sorbent injection rate to the predetermined maximum injection rate after the cleaning cycle has terminated.

4. A pollutant removal system in accordance with claim 1, wherein said particulate control device comprises at least one filter, wherein the flue gas stream is at least partially channeled through said at least one filter.

5. A pollutant removal system in accordance with claim 4, wherein said sorbent control system is configured to adjust the sorbent injection rate based on a differential pressure across said at least one filter.

6. A pollutant removal system in accordance with claim 5, wherein said sorbent control system is configured to adjust the sorbent injection rate to be substantially inversely proportional to the differential pressure after the sorbent injection rate reaches a predetermined maximum injection rate.

7. A pollutant removal system in accordance with claim 1, wherein said sorbent control system is configured to increase the sorbent injection rate to a predetermined maximum injection rate after the cleaning cycle has initiated and before the cleaning cycle has terminated.

8. A pollutant removal system in accordance with claim 1, wherein said sorbent control system is configured to:
increase the sorbent injection rate to a predetermined maximum injection rate after a termination of the cleaning cycle;
maintain the sorbent injection rate for a predetermined amount of time; and
decrease the sorbent injection rate to a predetermined minimum injection rate after the predetermined amount of time has elapsed.

9. A power generation system comprising:
a furnace configured to combust fuel and to generate a stream of flue gas from the combusted fuel;
a particulate control device coupled in flow communication with said furnace and configured to remove particulates from the flue gas stream, said particulate control device cleaned on a predetermined cleaning cycle; and
a sorbent control system for controllably injecting a sorbent into the flue gas stream upstream of said particulate control device, said sorbent control system configured to increase a sorbent injection rate based on a cleaning cycle initiation time of the predetermined cleaning cycle.

10. A power generation system in accordance with claim 9, wherein said sorbent control system is configured to:
increase the sorbent injection rate to a predetermined maximum injection rate; and
decrease the sorbent injection rate after the predetermined maximum injection rate is reached.

11. A power generation system in accordance with claim 10, wherein said sorbent control system is configured to increase the sorbent injection rate to the predetermined maximum injection rate after the cleaning cycle has terminated.

12. A power generation system in accordance with claim 9, wherein said particulate control device comprises at least one filter, wherein the flue gas stream is at least partially channeled through said at least one filter.

13. A power generation system in accordance with claim 12, wherein said sorbent control system is configured to adjust the sorbent injection rate based on a differential pressure across said at least one filter.

14. A power generation system in accordance with claim 13, wherein said sorbent control system is configured to adjust the sorbent injection rate to be substantially inversely proportional to the differential pressure after the sorbent injection rate reaches a predetermined maximum injection rate.

15. A power generation system in accordance with claim 9, wherein said sorbent control system is configured to increase the sorbent injection rate to a predetermined maximum injection rate after the cleaning cycle has initiated and before the cleaning cycle has terminated.

16. A power generation system in accordance with claim 9, wherein said sorbent control system is configured to:
increase the sorbent injection rate to a predetermined maximum injection rate after a termination of the cleaning cycle;
maintain the sorbent injection rate for a predetermined amount of time; and
decrease the sorbent injection rate to a predetermined minimum injection rate after the predetermined amount of time has elapsed.

17. A method for removing pollutants from a flue gas stream, said method comprising:
receiving a flue gas stream including a plurality of pollutants entrained therein;
channeling the flue gas stream through at least one filter;
executing a cleaning cycle to remove particulates from the filter; and
controllably injecting, using a control device, sorbent into the flue gas stream such that the sorbent is at least partially retained by the filter, wherein a sorbent injection rate is increased based on a cleaning cycle initiation time of the cleaning cycle.

18. A method in accordance with claim 17, further comprising increasing the sorbent injection rate after a termination of the cleaning cycle.

19. A method in accordance with claim 18, further comprising progressively decreasing the sorbent injection rate after the sorbent injection rate has reached a predetermined maximum injection rate.

20. A method in accordance with claim 17, further comprising:
increasing the sorbent injection rate to a predetermined maximum injection rate after a termination of the cleaning cycle;
maintaining the sorbent injection rate for a predetermined amount of time; and
decreasing the sorbent injection rate to a predetermined minimum injection rate after the predetermined amount of time has elapsed.

* * * * *